US012779471B2

(12) United States Patent
Leuschen et al.

(10) Patent No.: US 12,779,471 B2
(45) Date of Patent: Nov. 3, 2026

(54) SYSTEM FOR OVERLOAD PROTECTION AND GAP SETTING FOR A COMPACT ECCENTRIC CRUSHER

(71) Applicant: METSO USA INC., Brookfield, WI (US)

(72) Inventors: Guido Leuschen, Bielefeld (DE); Leon Bei der Sandwisch, Neuenkirchen (DE); Irina Kuhn, Warendorf (DE)

(73) Assignee: Metso USA Inc., Brookfield, WI (US)

( * ) Notice: Subject to any disclaimer, the term of this patent is extended or adjusted under 35 U.S.C. 154(b) by 169 days.

(21) Appl. No.: 18/932,777

(22) Filed: Oct. 31, 2024

(65) Prior Publication Data

US 2026/0115728 A1 Apr. 30, 2026

(51) Int. Cl.
*B02C 1/08* (2006.01)
*B02C 1/02* (2006.01)

(52) U.S. Cl.
CPC ................ *B02C 1/025* (2013.01); *B02C 1/08* (2013.01)

(58) Field of Classification Search
CPC ........... B02C 1/02; B02C 1/025; B02C 13/02; B02C 13/09; B02C 13/095
See application file for complete search history.

(56) References Cited

U.S. PATENT DOCUMENTS 7,708,218 B2 * 5/2010 Nakayama ............ B02C 21/026 241/101.74
7,942,356 B2 * 5/2011 Dallimore ............ B02C 13/282 241/189.1
9,339,820 B2 * 5/2016 Lindberg .................. B02C 1/02
9,849,459 B2 * 12/2017 Faure .................... B02C 13/282
10,279,354 B2 * 5/2019 Young ..................... B02C 13/09
10,549,283 B2 * 2/2020 Sjobeck .................. B02C 1/025
(Continued)

FOREIGN PATENT DOCUMENTS

CN 111298893 A 6/2020
WO 2008010072 A2 1/2008
(Continued)

OTHER PUBLICATIONS

International Search Report and Written Opinion for International Patent Application No. PCT/US2025/050281, mailed Feb. 5, 2026.

*Primary Examiner* — Matthew Katcoff
(74) *Attorney, Agent, or Firm* — Andrus Intellectual Property Law, LLP

(57) ABSTRACT

A compact eccentric crusher includes a crusher jaw adjustment assembly for adjusting the size of the crushing gap between a crushing roller and a crusher jaw. The adjustment assembly includes a connection arm having a first end connected to a second end of the crusher jaw. A second end of the connection arm is connected to a slider that is mounted for movement along a slide rail. The adjustment assembly includes a drive unit operable to move the slider along the slide rail, resulting in corresponding movement of the connection arm and the second end of the crusher jaw. In one embodiment, the drive unit is a hydraulic cylinder having a cylinder rod connected to the slider. Upon an overload condition, the adjustment assembly allows the connection arm to move against the drive unit and the crusher jaw to move away from the crushing roller to adjust the crushing gap.

20 Claims, 7 Drawing Sheets

(56) References Cited

U.S. PATENT DOCUMENTS

| | | | |
|---|---|---|---|
| 2007/0029422 | A1 | 2/2007 | Niemela |
| 2013/0099038 | A1 | 4/2013 | Hartl |
| 2015/0107232 | A1 | 4/2015 | Burhoff |
| 2021/0039107 | A1 | 2/2021 | Meyer |
| 2024/0278252 | A1 | 8/2024 | Bei Der Sandwisch |

FOREIGN PATENT DOCUMENTS

| | | | |
|---|---|---|---|
| WO | 2023089552 | A1 | 5/2023 |
| WO | 2023139801 | A1 | 7/2023 |
| WO | 2024069462 | A1 | 4/2024 |
| WO | 2024100585 | A1 | 5/2024 |

* cited by examiner

SYSTEM FOR OVERLOAD PROTECTION AND GAP SETTING FOR A COMPACT ECCENTRIC CRUSHER

BACKGROUND

The present disclosure generally relates to a system for adjusting the crushing gap in a compact eccentric crusher. More specifically, the present disclosure relates to an overload protection system that is operable to adjust the size of the crushing gap and protects against overload conditions in a compact eccentric crusher.

Presently, different types of crushers are being used to reduce the size of mineral material present in an infeed to the crusher. After processing, the size of the mineral material has been reduced to create a supply of the mineral material having smaller sized individual components. In these types of crushers, a moving crushing member moves toward and away from a stationary crushing member to create a varying crushing gap to crush the mineral material of the infeed.

One type of crusher used to reduce the size of mineral material is referred to as a compact eccentric crusher. In a compact eccentric crusher, a freely rotatable crushing roller is mounted to an eccentric shaft by a series of roller bearings. The crushing roller is spaced from a generally stationary crusher jaw. In the compact eccentric crusher, the eccentric arrangement of the crushing roller on the eccentric drive shaft creates eccentric movement of the crushing roller toward and away from the stationary crusher jaw. This movement varies the size of the crushing gap, which causes the mineral material fed into the compact eccentric crusher to be crushed in the crushing gap.

During operation, the freely rotatable mounting of the crushing roller on the eccentric drive shaft results in a slow rotation of the crushing roller about the eccentric drive shaft in a direction opposite to the rotation of the eccentric drive shaft. Although the crushing force is created by the lateral movement of the crushing roller relative to the stationary crusher jaw, the free rotation of the crushing roller distributes wear to all portions of the outer circumference of the crushing roller.

The size of the crushing gap between the crushing roller and the crusher jaw dictates the size of the particles of mineral material that is discharged from the compact eccentric crusher. The size of the crushing gap is adjusted by moving the crusher jaw toward or away from the crushing roller. In currently available eccentric crusher, an adjustment assembly is positioned behind the crusher jaw and is operable to move the crusher jaw into and out of the crushing chamber to adjust the crushing gap. In such an adjustment assembly, the crushing forces acting on the crusher jaw are directly opposed by the adjustment assembly, which increases the size of the drive unit, such as a hydraulic cylinder, needed to both adjust the size of the crushing gap and oppose the crushing forces during operation.

The inventors of the present disclosure have recognized a need for an improvement in crusher jaw adjustment assembly that would allow for movement of the crusher jaw and would react to an overload condition. The system of the present disclosure includes a crusher jaw adjustment assembly that transfers the movement forces created by a drive unit into the movement of a connecting arm coupled to the crusher jaw. Such translation of forces reduces the required size of the drive unit and allows the crusher jaw adjustment assembly to release tramp forces created in the crushing gap.

SUMMARY

The present disclosure generally relates to a system for adjusting the crushing gap in a compact eccentric crusher.

More specifically, the present disclosure relates to an overload protection system that is operable to adjust the size of the crushing gap and protects against overload conditions in a compact eccentric crusher.

In accordance with one exemplary embodiment of the present disclosure, a crusher is provided that is operable to crush a supply of mineral material. The crusher includes a crusher frame that at least partially defines a crushing chamber. Within the crushing chamber, a crushing roller is mounted to a drive shaft for rotation in the crushing chamber. A crusher jaw is positioned to further define the crushing chamber. The crusher jaw is spaced from the crushing roller such that a crushing gap is formed between the crushing roller and the crusher jaw. The crusher jaw includes a first end pivotably mounted such that a second end of the crusher jaw is movable into and out of the crushing chamber to adjust the crushing gap.

The crusher includes a crusher jaw adjustment assembly that is operable to control the movement of the second end of the crusher jaw to thereby control the size of the crushing gap between the crusher jaw and the crushing roller. In accordance with an exemplary embodiment of the present disclosure, the crusher includes a pair of crusher jaw assemblies mounted on opposite sides of the crusher frame to act on each side of the crusher jaw. The crusher jaw assembly includes a connection arm that has a first end and a second end. The first end of the connection arm is connected to the second end of the crusher jaw such that movement of the first end of the connection arm results in movement of the second end of the crusher jaw.

The second end of the connection arm is connected to a slider that is mounted for longitudinal movement along a slider rail. Movement of the slider along the slider rail results in movement of the second end of the connection arm and thus movement of the first end of the connection arm. In accordance with one exemplary embodiment, the slider rail is positioned at an angle relative to vertical such that movement of the slider along the slide rail results in horizontal and vertical movement of the second end of the connection arm.

A drive unit is included as part of the crusher jaw assembly and is operable to control the movement of the slider along the slider rail. In one exemplary embodiment, the drive unit is a hydraulic cylinder including a cylinder rod that can be extended and retracted from a cylinder body. One end of the cylinder rod is connected to the slider such that the extension and retraction of the cylinder rod controls the movement of the slider and the connected connection arm. The opposite end of the connection arm is coupled to the second end of the crusher jaw, which thereby translates the movement of the slider to movement of the crusher jaw.

In accordance with another exemplary embodiment of the present disclosure, a compact eccentric roll crusher is provided that is operable to crush a supply of mineral material. The crusher includes a crusher frame that at least partially defines a crushing chamber. Within the crushing chamber, a crushing roller is mounted to a drive shaft for eccentric movement within the crushing chamber. A crusher jaw is positioned to further define the crushing chamber. The crusher jaw is spaced from the crushing roller such that a crushing gap is formed between the crushing roller and the crusher jaw. The crusher jaw includes a first end pivotably mounted such that a second end of the crusher jaw is movable into and out of the crushing chamber to adjust the crushing gap.

The crusher includes a pair of crusher jaw adjustment assemblies that are operable to control the movement of the second end of the crusher jaw to thereby control the size of the crushing gap between the crusher jaw and the crushing roller. In accordance with an exemplary embodiment of the present disclosure, the pair of crusher jaw assemblies are mounted on opposite sides of the crusher frame to act on each side of the crusher jaw. The crusher jaw assembly includes a connection arm that has a first end and a second end. The first end of the connection arm is connected to the second end of the crusher jaw such that movement of the first end of the connection arm results in movement of the second end of the crusher jaw.

The second end of the connection arm is connected to a slider that is mounted for longitudinal movement along a slider rail. Movement of the slider along the slider rail results in movement of the second end of the connection arm and thus movement of the first end of the connection arm. In accordance with one exemplary embodiment, the slider rail is positioned at an angle relative to vertical such that movement of the slider along the slide rail results in horizontal and vertical movement of the second end of the connection arm.

A drive unit is included as part of the crusher jaw assembly of the compact eccentric roll crusher and is operable to control the movement of the slider along the slider rail. In one exemplary embodiment, the drive unit is a hydraulic cylinder including a cylinder rod that can be extended and retracted from a cylinder body. One end of the cylinder rod is connected to the slider such that the extension and retraction of the cylinder rod controls the movement of the slider and the connected connection arm. The opposite end of the connection arm is coupled to the second end of the crusher jaw, which thereby translates the movement of the slider to movement of the crusher jaw.

In accordance with another exemplary embodiment of the present disclosure, an adjustment assembly is provided for use with a crusher that is operable to crush a support of mineral material. The crusher includes a includes a crusher frame that at least partially defines a crushing chamber. Within the crushing chamber, a crushing roller is mounted to a drive shaft for rotation in the crushing chamber. A crusher jaw is positioned to further define the crushing chamber. The crusher jaw is spaced from the crushing roller such that a crushing gap is formed between the crushing roller and the crusher jaw. The crusher jaw includes a first end pivotably mounted such that a second end of the crusher jaw is movable into and out of the crushing chamber to adjust the crushing gap.

The adjustment assembly includes a pair of crusher jaw adjustment assemblies that are operable to control the movement of the second end of the crusher jaw to thereby control the size of the crushing gap between the crusher jaw and the crushing roller. In accordance with an exemplary embodiment of the present disclosure, the pair of crusher jaw assemblies are mounted on opposite sides of the crusher frame to act on each side of the crusher jaw. The crusher jaw assembly includes a connection arm that has a first end and a second end. The first end of the connection arm is connected to the second end of the crusher jaw such that movement of the first end of the connection arm results in movement of the second end of the crusher jaw.

The second end of the connection arm is connected to a slider that is mounted for longitudinal movement along a slider rail. Movement of the slider along the slider rail results in movement of the second end of the connection arm and thus movement of the first end of the connection arm. In accordance with one exemplary embodiment, the slider rail is positioned at an angle relative to vertical such that movement of the slider along the slide rail results in horizontal and vertical movement of the second end of the connection arm.

A drive unit is included as part of the crusher jaw assembly of the compact eccentric roll crusher and is operable to control the movement of the slider along the slider rail. In one exemplary embodiment, the drive unit is a hydraulic cylinder including a cylinder rod that can be extended and retracted from a cylinder body. One end of the cylinder rod is connected to the slider such that the extension and retraction of the cylinder rod controls the movement of the slider and the connected connection arm. The opposite end of the connection arm is coupled to the second end of the crusher jaw, which thereby translates the movement of the slider to movement of the crusher jaw.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
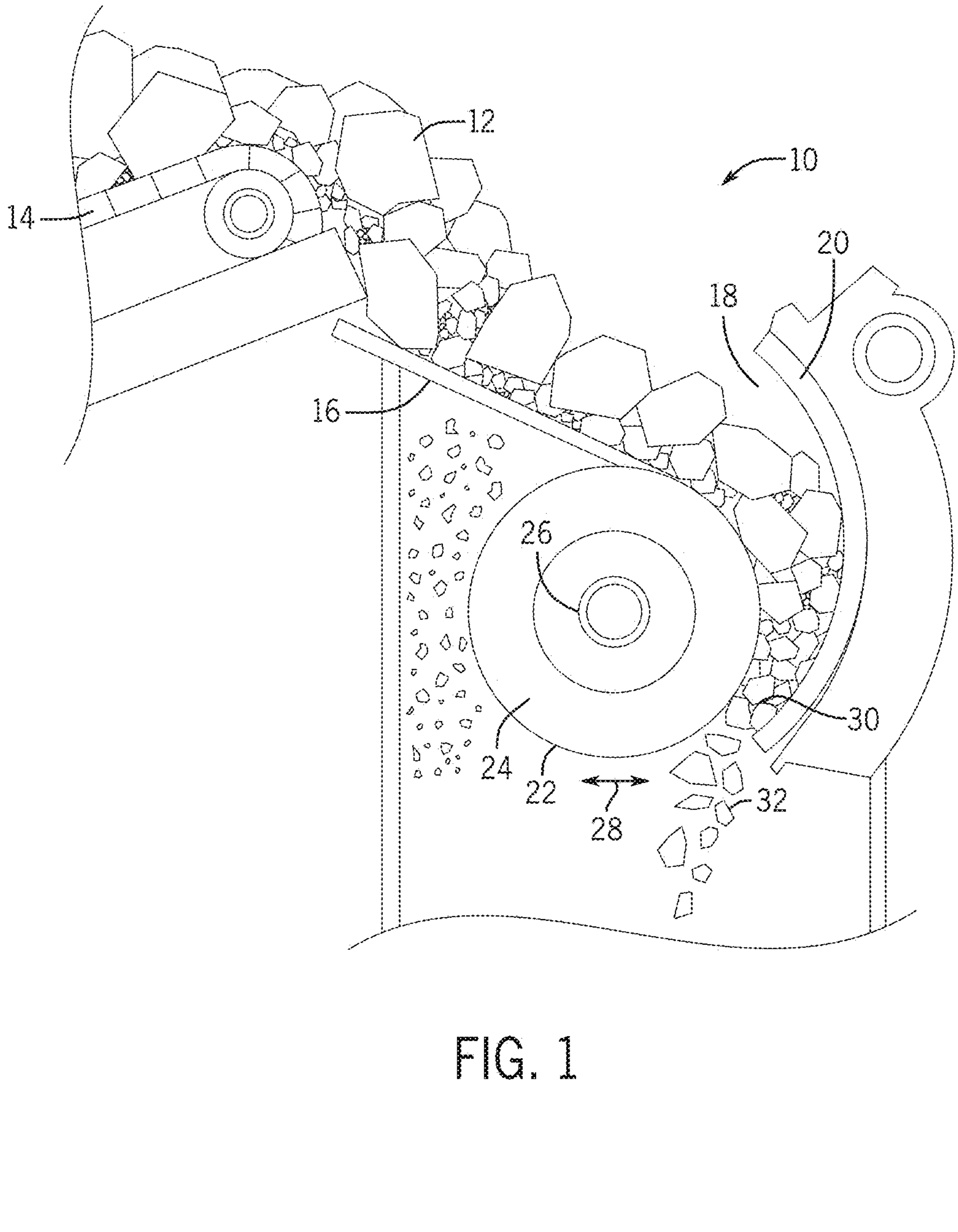
FIG. 1 is a side view showing the general operation of a compact eccentric crusher that includes a stationary crusher jaw and a movable crushing roller.

FIG. 1 generally illustrates the operation of a compact eccentric crusher 10. The compact eccentric crusher 10 shown in FIG. 1 is a representative embodiment that is included to show the general operation and configuration of a compact eccentric crusher 10 and does not limit the scope of the present disclosure since it is being included for illustrative purposes. As illustrated in FIG. 1, the compact eccentric crusher 10 receives a supply of mineral material 12 from an infeed conveyor 14. In the embodiment shown, the supply of mineral material 12 may include particles of different sizes that all fall upon an infeed screen 16 that includes slots or other openings that allow particles of a small enough size to bypass the primary crushing operation. The infeed screen 16 directs the larger particles of the supply of mineral material into a crushing chamber 18. In other contemplated embodiments, the infeed screen 16 could be eliminated such that the entire supply of material would be directed to the crushing chamber 18

The crushing chamber 18 is generally formed between the crusher jaw 20 and the outer surface 22 of the crushing roller 24. The crushing roller 24 is mounted to a drive shaft 26 that is supported by an eccentric bearing assembly that creates eccentric movement of the outer surface 22 of the crushing roller 24 along an eccentric path that includes movement toward and away from the stationary crusher jaw 20, as schematically illustrated by arrow 28. The eccentric movement of the entire crushing roller 24 toward and away from the stationary crusher jaw 20 increases and decreases the size of the crushing gap 30. During operation of the crushing roller 24, the increase and decrease in the size of the crushing gap 30 crushes the larger particles of the infeed stream to result in an outlet product flow 32.

In addition to the movement of the entire crushing roller 24, the position of the crusher jaw 20 can be modified in accordance with the present disclosure to vary the maximum and minimum size of the crushing gap 30. However, during the crushing operation, it is the eccentric movement of the crushing roller 24 relative to the stationary crusher jaw 20 that creates the crushing forces to convert the inlet product flow to the outlet product flow 32.

Figure 2:
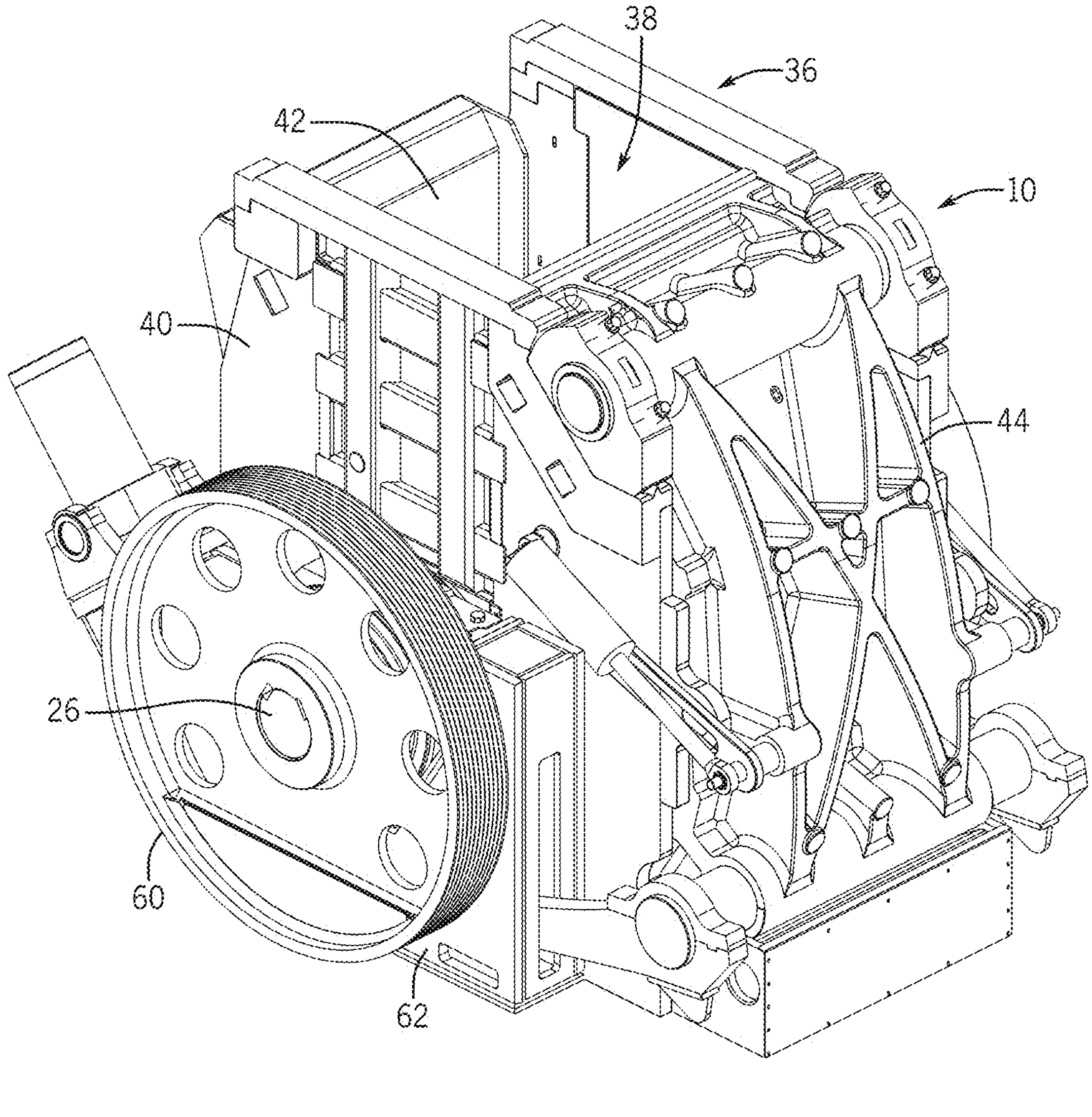
FIG. 2 is a perspective view of a compact eccentric crusher including the subject matter of the present disclosure.
Figure 3:
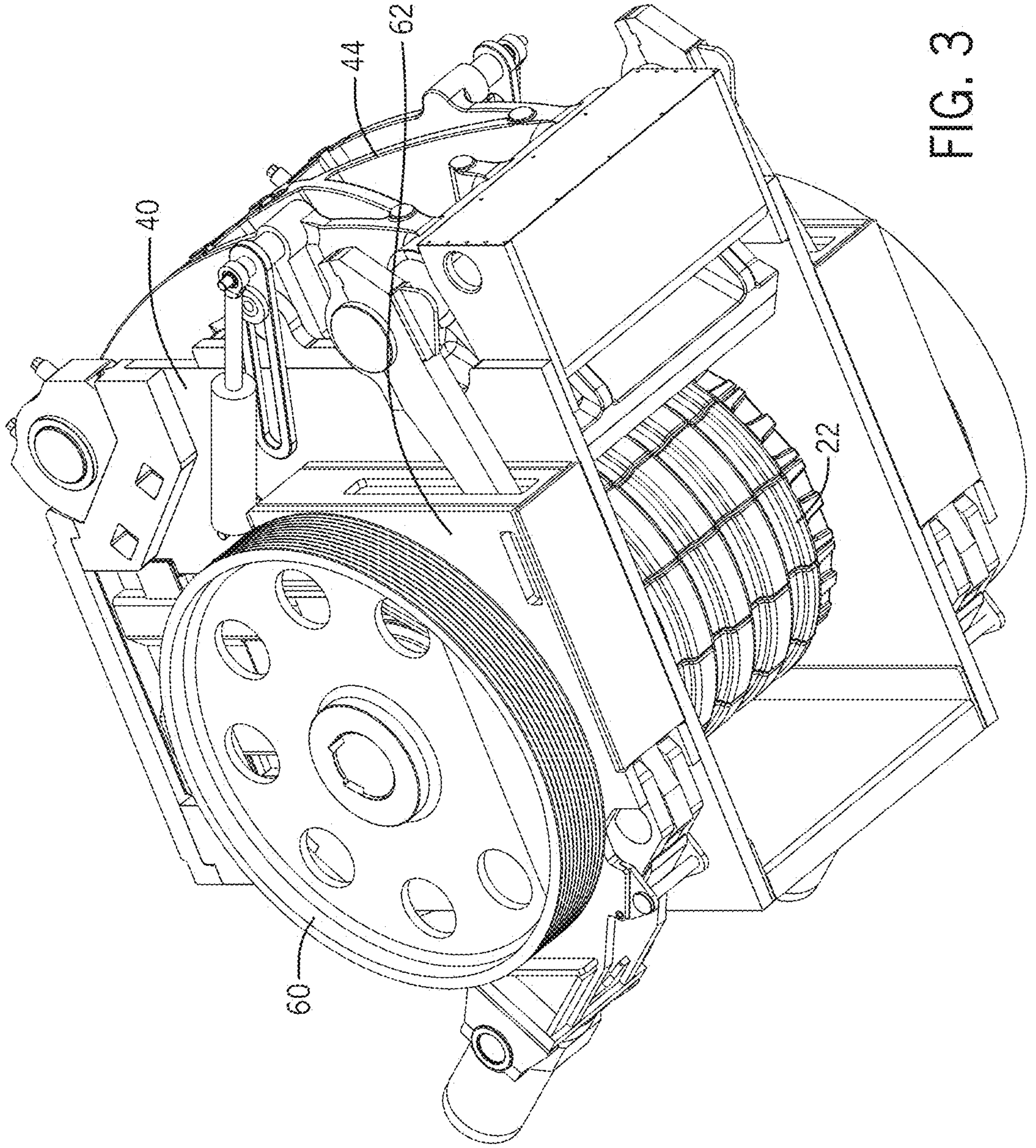
FIG. 3 is a bottom perspective view of the compact eccentric crusher of the present disclosure.
Figure 4:
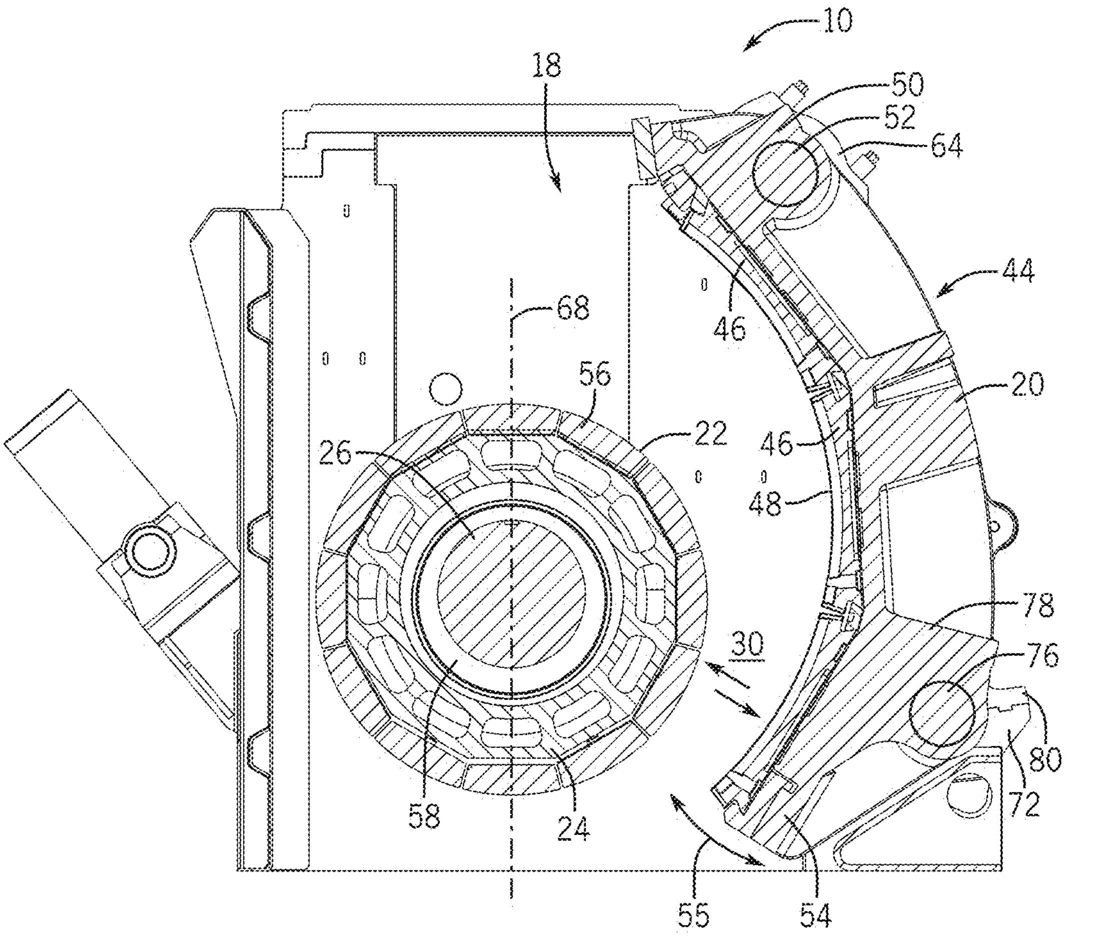
FIG. 4 is a section view of the compact eccentric crusher showing the crusher jaw and crushing roller.

Referring now to FIGS. 2 and 3, the compact eccentric crusher 10 constructed in accordance with the present disclosure will now be further described. In the embodiment shown in FIGS. 2 and 3, the compact eccentric crusher 10 is shown as including a frame 36 that is designed to support the eccentric movement of the crusher roller and to receive a product flow at an open upper end 38 that feeds into an internal crushing chamber 18, as was schematically illustrated in FIG. 1. The frame 36 includes a pair of side walls 40 that are each spaced from each other to define a portion of the crushing chamber. A rear wall 42 further defines the crushing chamber while the crusher jaw assembly 44 defines the front portion of the crushing chamber The crusher jaw assembly 44 includes the crusher jaw 20 that includes a series of wear plates 46 as best shown in FIG. 4. The wear plates 46 define a contact surface 48 for the crusher jaw 20 that is spaced from the outer surface 22 of the crushing roller 24. The spacing between the outer surface 22 of the crushing roller 24 and the contact surface 48 of the wear plates 46 creates the crushing gap 30 used to crush the mineral material fed into crushing chamber 18 of the compact eccentric crusher 10. In the embodiment shown in FIG. 4, an upper, first end 50 of the crusher jaw 20 is mounted for rotational movement about a pivot shaft 52. The lower, second end 54 of the crusher jaw 20 can be pivoted relative to the pivot shaft 52 to move inward and outward to adjust the size of the crushing gap 30. As indicated previously, during operation of the compact eccentric crusher 10, the crusher jaw 20 is maintained in a stationary position while the crushing roller 24 moves along an eccentric path to increase and decrease the size of the crushing gap 30 to crush the mineral material The crushing roller 24 includes a series of wear members 56 installed on the crushing roller 24 to define the outer surface 22. During operation of the compact eccentric crusher 10, the outer surface 22 contacts the mineral material being crushed and is thus subject to wear. The individual wear members 56 can be removed from the crushing roller 24 upon sufficient wear. The crushing roller 24 is mounted to the drive shaft 26 by a series of roller bearings such that the crushing roller 24 can freely rotate relative to the drive shaft 26. During normal operation, the crushing roller 24 may not rotate or may rotate in the opposite direction as the rotation of the drive shaft 26. The drive shaft 26 is rotatable by a drive motor or motors during operation of the compact eccentric crusher 10

As illustrated in the section view of FIG. 4, an eccentric bearing 58 is located between the crushing roller 24 and the drive shaft 26. In this manner, rotation of the drive shaft 26 creates eccentric movement of the entire crushing roller 24, thus causing the lateral movement of the crushing roller 24 toward and away from the crusher jaw 20. Such eccentric movement increases and decreases the size of the crushing gap 30 to crush the mineral material in the crushing gap 30.

Referring back to FIGS. 2 and 3, the compact eccentric crusher 10 further includes a fly wheel 60 mounted to either side of the drive shaft 26. The fly wheel 60 provides rotational mass that combines with the mass of the crushing roller during operation of the compact eccentric crusher 10. The fly wheels 60 are mounted axially outward from a bearing support structure 62 located on each side of the compact eccentric crusher 10. The bearing support structures 62 provide support for one of a pair of bearing assemblies that are used to support the crushing roller within the open crushing chamber 18 defined by the frame.

Figure 5:
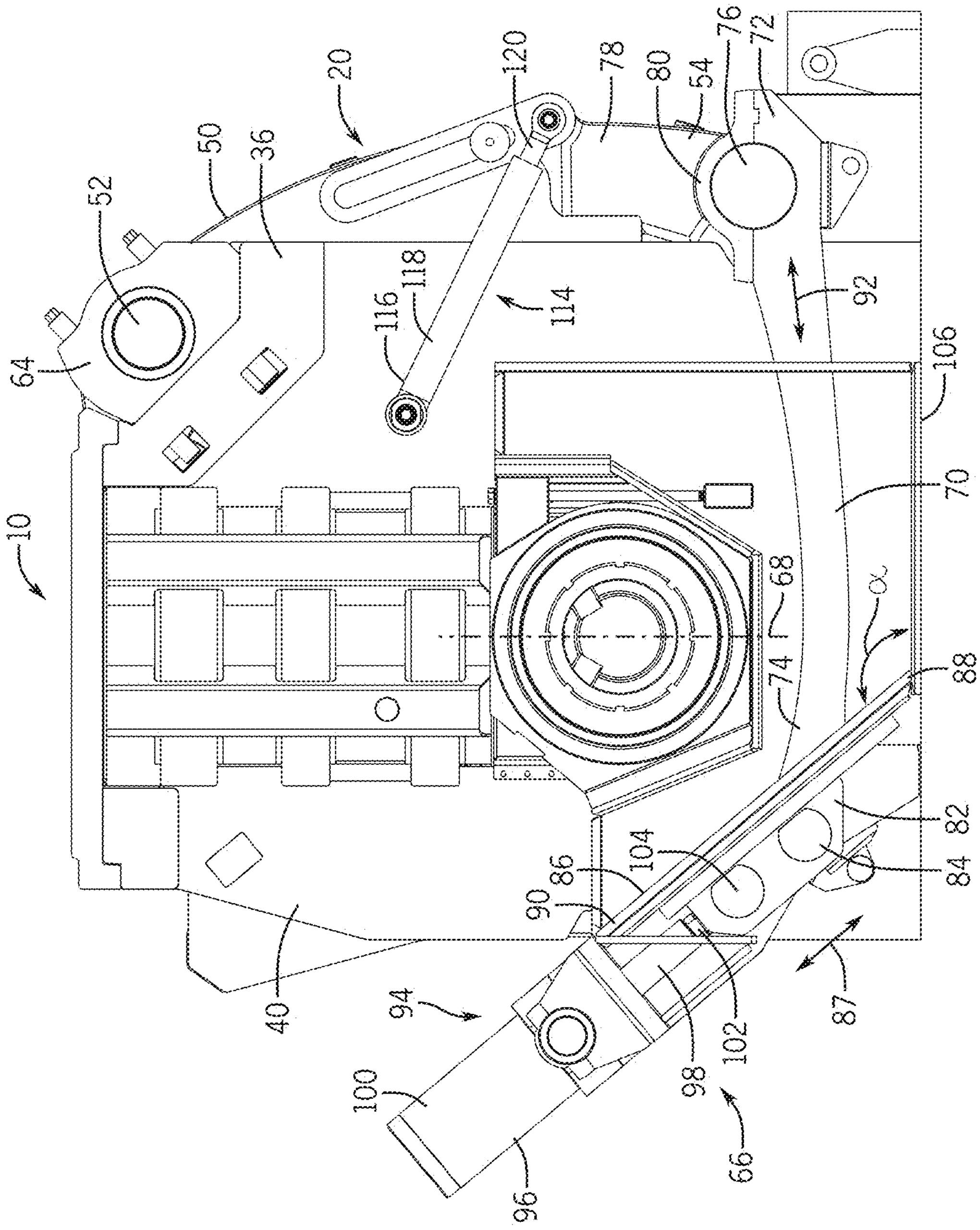
FIG. 5 is a side view of the compact eccentric crusher with the jaw adjustment assembly in a fully retracted position.

Referring now to FIG. 5, the first end 50 of the crusher jaw 20 is shown supported by the upper pivot shaft 52. The upper pivot shaft 52 passes through and is supported by a pair of upper bearing assemblies 64 on each side of the frame 36. Each upper bearing assembly 64 is located near a top end of the frame 36 of the compact eccentric crusher 10. The pivoting connection between the upper, first end 50 of the crusher jaw 20 allows the lower, second end 54 of the crusher jaw 20 to move into and out of the crushing chamber 18, as best shown by arrow 55 in FIG. 4. Such movement controls the size of the crushing gap 30.

In accordance with the present disclosure, a crusher jaw adjustment assembly 66 is positioned on both the first and second sides of the crusher frame 36 and is operable to control the movement of the second end 54 of the crusher jaw 20. Through use of the crusher jaw adjustment assemblies 66 located on each side of the crusher, the position of the crusher jaw 20 can be adjusted to control the size of the crushing gap 30 formed within the compact eccentric crusher 10. In addition, the crusher jaw adjustment assemblies 66 allow the crusher jaw to shift outward to react to an overload condition in the crushing chamber 18, such as when tramp material enters into the crushing gap 30 and cannot be crushed.

Referring back to FIG. 4, the compact eccentric crusher 10 includes the crushing roller 24 that is located within the crushing chamber 18. The crushing roller 24 includes a vertical center line 68 that also extends through the center of the drive shaft 26. The vertical center line 68 defines an inlet side of the crushing roller 24 that is located to the left of the center line 68 in FIG. 4 and an outlet side that is located to the right of the center line 68 in FIG. 4. The outlet side includes the crushing gap 30. When mineral material is fed into the crushing chamber 18, the mineral material travels to the outlet side of the crushing roller 24 and into the crushing gap 30. During crushing operations, the crushing forces created by the eccentric movement of the crushing roller 24 creates an outward force directed against the crusher jaw 20 and an opposing inward crushing force directed against the outer surface of the crushing roller 24, as shown by the opposing arrows in FIG. 4. Since the crusher jaw 20 is pivotable about the pivot shaft 52, operating components of the compact eccentric crusher 10 must be able to resist the outward crushing force on the crusher jaw 20 to prevent undesired pivoting rotation of the crusher jaw 20 about the pivot shaft 52.

Referring back to FIG. 5, the crusher jaw adjustment assembly 66 on the side of the crusher frame shown includes a connection arm 70 that extends between a first end 72 and a second end 74. The first end 72 of the connection arm 70 is securely connected to the lower support shaft 76. The lower support shaft 76, as shown in the section view of FIG. 4, extends through an opening formed in the frame 78 of the crusher jaw 20 near the second end 54. As shown in FIG. 5, the lower support shaft 76 is rotatable within an opening formed between the first end 72 of the connection arm 70 and a retaining bracket 80. In this manner, the first end 72 of the connection arm 70 is connected to the frame 78 of the crusher jaw 20 while allowing the first end 72 to generally rotate in relation to the lower support shaft 76.

As shown in FIG. 5, the second end 74 of the connection arm 70 is attached to a slider 82 that forms another part of the crusher jaw adjustment assembly 66. Specifically, the second end 74 of the connection arm 70 is secured to the slider by a first pivot pin 84. The first pivot pin 84 allows for relative rotational movement between the slider 82 and the second end 74 of the connection arm 70. The slider 82 is mounted for movement along a slider rail 86 that extends from a lower end 88 to an upper end 90. The slider rail 86 includes a track that allows the slider 82 to move along a fixed longitudinal path in both a first direction and a second direction along the entire length of the slider rail 86. Since the slider 82 is connected to the second end 74 of the connection arm 70, the movement of the slider 82 in the direction shown by the arrows in FIG. 5 results in movement of the slider arm in the direction shown by arrows 92. Thus, movement of the slider 82 along the slider rail 86 controls the movement of the first end 72 of the connection arm 70, and thus the second end 54 of the crusher jaw frame 78.

The crusher jaw adjustment assembly 66 further includes a drive unit 94 that is operable to move the slider 82 along the length of the slider rail. 86. In the exemplary embodiment shown in FIG. 5, the drive unit 94 is a hydraulic cylinder 96 that includes a cylinder rod 98 that can be extended and retracted relative to the cylinder body 100. As is well-known in the art, the hydraulic cylinder 96 is connected to a supply of pressurized hydraulic fluid to control the retraction and extension of the cylinder rod 98 relative to the cylinder body 100. Although a hydraulic cylinder 96 is shown in the exemplary embodiment of FIG. 5, the hydraulic cylinder 96 could be replaced by other drive units, such as but not limited to an electric motor and rotating drive screw. It is contemplated that the drive unit 94 could be any type of drive unit that is able to create the longitudinal movement of the slider 82 along the slider rail 86 as indicated by arrow 87.

In the embodiment illustrated in FIG. 5, the outer end 102 of the cylinder rod 98 is connected to a second pin 104 that extends through another portion of the slider 82. This connection results in movement of the slider 82 in direct response to the movement of the cylinder rod 98.

As can be understood in FIG. 5, the first end 72 of the connection arm 70 is located on an opposite side of the vertical center line 68 extending through the crushing roll. In addition, the drive unit 94, slider 82 and slider rail 86 are also each located on the inlet side of the center line 68 while the first end 72 and thus the connection to the second end 54 of the crusher jaw 20 is located on the outlet side of the center line 68.

As best shown in FIG. 5, the slider rail 86 is mounted at an angle relative to both the vertical center line 68 and the generally horizontal bottom surface 106 of the compact eccentric crusher 10. The angle $\alpha$ shown in FIG. 5 is approximately 135°, although other values for the angle $\alpha$ are contemplated as being within the scope of the present disclosure. As can be understood in FIG. 5, the longitudinal movement of the slider 82 in the direction shown by arrow 87 has both a vertical and horizontal component. This longitudinal movement is generally translated to the horizontal and slightly vertical movement of the connecting arm 70, as shown by arrow 92 also in FIG. 5. The movement shown by arrow 92 in FIG. 5 results in movement of the second end 54 of the crusher frame 78 into and out of the crushing chamber to adjust the size of the crushing gap 30, as is shown in FIG. 4. In this manner, operation of the drive unit 94 of the crusher jaw adjustment assembly 66 can control the position of the second end 54 of the crusher jaw 20 to thereby control the size of the crushing gap 30.

FIG. 5 illustrates the crusher jaw adjustment assembly 66 in a fully retracted position in which the cylinder rod 98 is fully retracted into the cylinder body 100. In the fully retracted position, the slider 82 is moved upward to a maximum vertical position. Since the slider 82 is connected to the connection arm 70, the connection arm 70 causes the second end 54 of the crusher jaw 20 to be moved inward as far as possible into the crushing chamber to minimize the size of the crushing gap 30.

Figure 6:
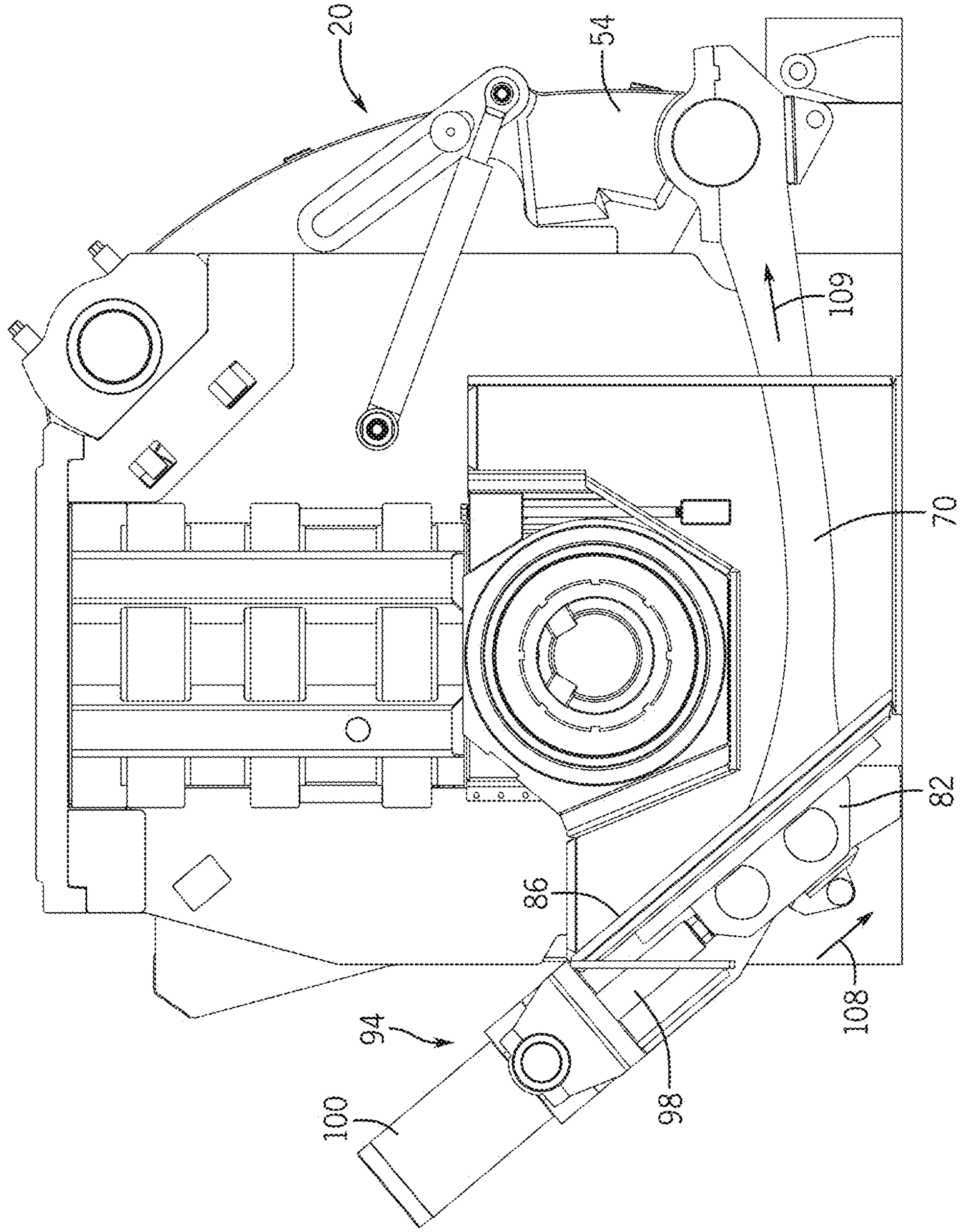
FIG. 6 is a side view of the compact eccentric crusher with the jaw adjustment assembly in a middle adjustment position.

Referring now to FIG. 6, when the size of the crushing gap 30 needs to be increased, the drive unit 94 is activated, which causes the cylinder rod 98 to extend further from the cylinder body 100, thus causing the slider 82 to move downward, as shown by arrow 108. The downward movement of the slider 82 along the slider rail 86 causes the connection arm 70 to move in the direction shown by arrow 109, thus causing the second end 54 of the crusher jaw 20 to move out of the crushing chamber, thereby expanding the size of the crushing gap 30. The slider 82 is shown in an intermediate position between the fully retracted position of FIG. 5 and the fully extended position shown in FIG. 7 and described below.

Figure 7:
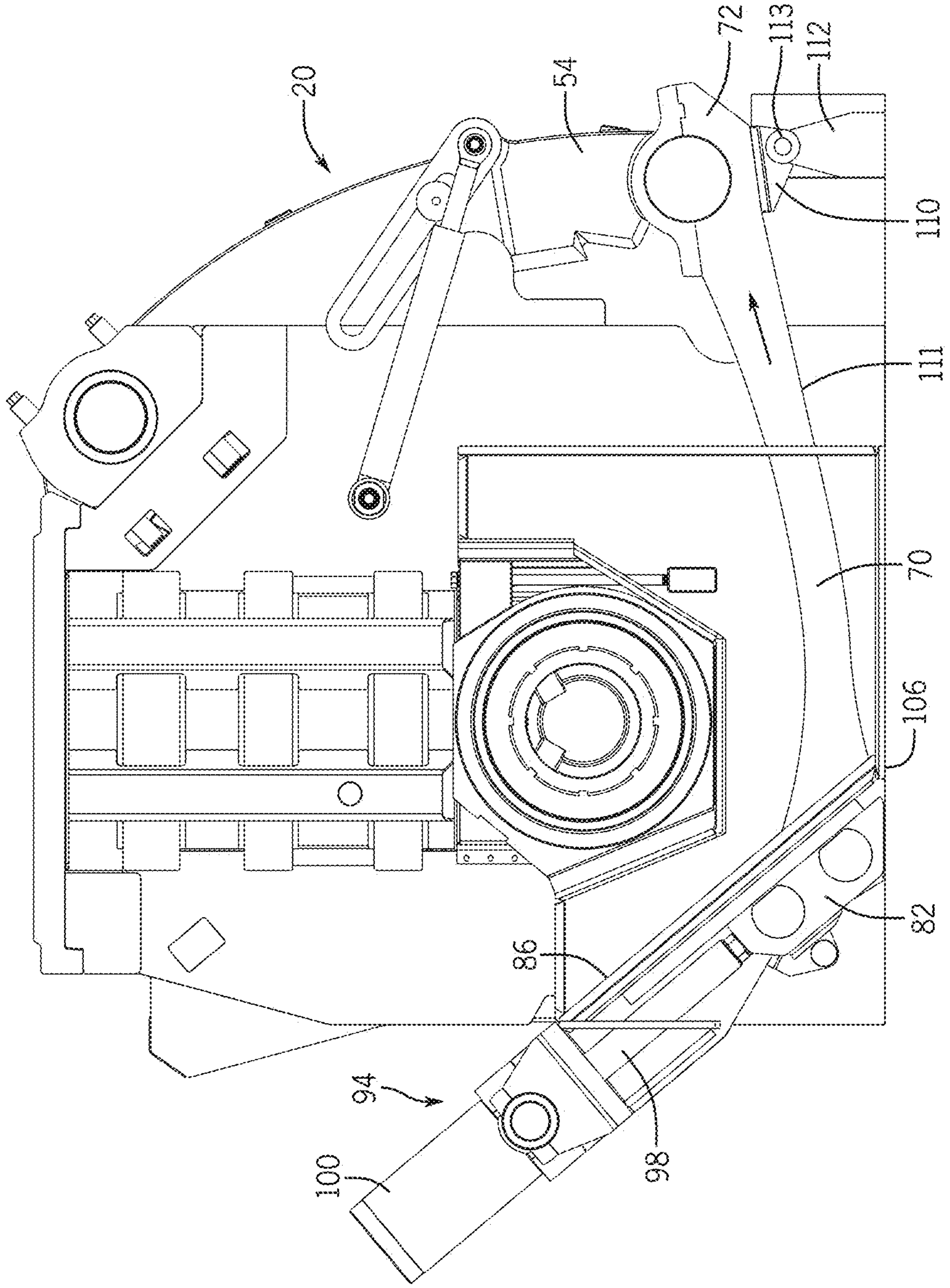
FIG. 7 is a side view of the compact eccentric crusher with the jaw adjustment assembly in the fully extended position.

As the drive unit 94 is further activated as shown in FIG. 7, the cylinder rod 98 extends yet further from the cylinder body 100 until the slider 82 reaches the fully extended position. In the fully extended position, the slider 82 is positioned adjacent to the bottom surface 106. This additional movement of the slider 82 along the slider rail 86 in the direction illustrated in FIG. 6 by arrow 108 causes the second end 54 of the crusher jaw 20 to move away from the crushing roller and increases the size of the crushing gap. When the slider 82 is positioned in the fully extended position shown in FIG. 7, a locking bracket 110 mounted to the bottom surface 111 of the connecting arm 70 near the first end 72 is brought into alignment with a support stand 112. When the locking bracket 110 is aligned with the support stand 112, the locking bracket 110 can be secured to the support stand 112 by the use of a locking pin (not shown) that extends through aligned openings 113.

Referring back to FIG. 5, in accordance with the embodiment illustrated, the compact eccentric crusher 10 can include a pretension system 114 that is mounted between the side wall 40 of the frame 36 and the frame 78 of the crusher jaw 20. The pretension system 114 is designed to include a preset tension force that resists the crushing forces created within the crushing chamber while allowing the crusher jaw 20 to rotate outward upon an uncrushable piece of tramp material entering into the crushing gap. In the embodiment shown in FIG. 5, the pretension system 114 includes a pretension cylinder 116 that includes a cylinder body 118 and a cylinder rod 120. The cylinder body 118 includes a supply of pressurized fluid that resists the outward movement of the cylinder rod 120, such as during the receipt of tramp material within the crushing gap.

Although not shown in the drawing figures, it is contemplated that the crusher jaw adjustment assembly 66 including the pair of hydraulic cylinders 96 on each side of the crusher frame 36 could be replaced with a single pulling cylinder that would have a cylinder rod connected directly to the lower support shaft 76. In such a contemplated embodiment, the pulling cylinder could be used without the need for the slider 82 and the slide rail 86. However, the size of such pulling cylinder would need to be much larger than the pair of hydraulic cylinder 96 shown in the exemplary embodiment of the present disclosure. Further, it is contemplated that other types of mechanisms could be utilized and located on the inlet side of the center line 68 and used to move the second end 54 of the crusher jaw 20 as described previously.

As can be understood in the comparison of FIGS. 5-7, the operation of the hydraulic cylinder 96 to move the cylinder rod 98 into and out of the cylinder body 100 creates a driving force that extends along the axis of the cylinder rod 98. The slider 82 transitions the sliding force into a force that extends along the length of the connection arm 70 to cause the movement of the second end 54 of the frame 78 of the crusher jaw 20. In this manner, the combination of the slider 82, slider rail 86 and connection arm 70 transition the linear force created by the hydraulic cylinder 96 into a movement force that causes the desired movement of the second end 54 of the crusher jaw 20.

During an overload condition, the crusher jaw adjustment assembly 66 of the present disclosure allows the second end 54 of the crusher jaw 20 to flex outward when a piece of uncrushable material or an overload condition exists. When an overload condition occurs or a piece of uncrushable tramp material enters into the crushing gap, the tramp material creates a large instantaneous outward force on the second end 54 of the crusher jaw 20. In order to prevent damage to the crushing roller and the crusher jaw, it is desirable to allow the crusher jaw to flex outward to pass the uncrushable material. The large outward force is at least partially directed against the second end 54 of the crusher jaw 20. The large spike force attempts to move the first end 72 of the connection arm 70 to the right and away from the crushing gap. Such force on the connection arm 70 is transferred to the second end 74 of the connection arm 70. The transferred force creates a force on the slider 82 to urge the slider 82 to move downward along the slider rail 86. Such movement of the slider 82 depressurizes the cylinder body 100 by pulling the cylinder rod 98 out of the cylinder body 100, which allows the slider 82 to move downward to release the tramp material that is present in the crushing gap. The configuration of the crusher jaw adjustment assembly 66 as shown in FIG. 5 is located on the opposite side of the center line 68 from the crusher jaw 20 to help separate the crushing forces created during operation of the compact eccentric crusher 10.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A crusher for crushing a supply of mineral material, the crusher comprising:
- a crusher frame that at least partially defines a crushing chamber;
- a crushing roller mounted to a drive shaft for movement in the crushing chamber;
- a crusher jaw having a first end and a second end, wherein the first end is pivotably mounted such that the second end is movable into and out of the crushing chamber to adjust a crushing gap between the crusher jaw and crushing roller;
- a crusher jaw adjustment assembly positioned on first and second sides of the crusher frame, the crusher jaw adjustment assemblies being operable to control the movement of the second end of the crusher jaw, each crusher jaw adjustment assembly comprising:
  - a connection arm having a first end and a second end, wherein the first end is connected to the second end of the crusher jaw;
  - a slider mounted for longitudinal movement along a slider rail, wherein the second end of the connection arm is connected to the slider; and
  - a drive unit operable to move the slider along the slider rail to control the position of the second end of the crusher jaw.

2. The crusher of claim 1 wherein the slider rail is positioned at an angle relative to vertical.

3. The crusher of claim 1 wherein the drive unit is a hydraulic cylinder having an extendible cylinder rod connected to the slider.

4. The crusher of claim 1 wherein the second end of the connection arm is rotatably connected to the slider.

5. The crusher of claim 1 wherein the first end of the connection arm is rotatably connected to the second end of the crusher jaw.

6. The crusher of claim 1 wherein the connection arm extends below the drive shaft of the crushing roller.

7. The crusher of claim 1 wherein the first end of the connection arm and the second end of the connection arm are on opposite sides of a vertical center line of the crushing roller.

8. The crusher of claim 1 wherein the angle of the slide rail is generally perpendicular to the crushing forces created in the crushing gap.

9. The crusher of claim 1 wherein upon an overload condition in the crushing gap, the connection arm moves the slider to allow movement of the second end of the crusher jaw.

10. A compact eccentric roll crusher for crushing a supply of mineral material, the crusher comprising:
- a crusher frame that at least partially define a crushing chamber;
- a crushing roller mounted to a drive shaft for eccentric movement within the crushing chamber;
- a crusher jaw having a first end and a second end, wherein the first end is pivotably mounted such that the second end is movable into and out of the crushing chamber to adjust a crushing gap between the crusher jaw and crushing roller;
- a pair of crusher jaw adjustment assemblies being operable to control the movement of the second end of the crusher jaw, each crusher jaw adjustment assembly comprising:
  - a connection arm having a first end and a second end, wherein the first end is connected to the second end of the crusher jaw;
  - a slider mounted for longitudinal movement along a slider rail, wherein the second end of the connection arm is connected to the slider; and
  - a drive unit operable to move the slider along the slider rail to control the position of the second end of the crusher jaw.

11. The crusher of claim 10 wherein the slider rail is positioned at an angle relative to vertical.

12. The crusher of claim 10 wherein the drive unit is a hydraulic cylinder having an extendible cylinder rod connected to the slider.

13. The crusher of claim 10 wherein the first end of the connection arm is rotatably connected to the second end of the crusher jaw.

14. The crusher of claim 10 wherein the first end of the connection arm and the second end of the connection arm are on opposite sides of a vertical center line of the crushing roller.

15. The crusher of claim 10 wherein upon an overload condition in the crushing gap, the connection arm moves the slider to allow movement of the second end of the crusher jaw.

16. An adjustment assembly for use with a crusher operable to crush a supply of mineral material and having a crushing roller mounted to a drive shaft for rotation in a crushing chamber and a crusher jaw having a first end and a second end, wherein the first end is pivotably mounted such that the second end is movable into and out of the crushing chamber to adjust a crushing gap between the crusher jaw and crushing roller, the adjustment assembly comprising:

a pair of a crusher jaw adjustment assemblies positioned on first and second sides of the crusher, the crusher jaw adjustment assemblies being operable to control the movement of the second end of the crusher jaw, each crusher jaw adjustment assembly comprising:

a connection arm having a first end and a second end, wherein the first end is connected to the second end of the crusher jaw;

a slider mounted for longitudinal movement along a slider rail, wherein the second end of the connection arm is connected to the slider; and a drive unit operable to move the slider along the slider rail to control the position of the second end of the crusher jaw.

17. The adjustment assembly of claim 16 wherein the slider rail is positioned at an angle relative to vertical.

18. The adjustment assembly of claim 17 wherein the drive unit is a hydraulic cylinder having an extendible cylinder rod connected to the slider.

19. The adjustment assembly of claim 18 wherein the first end of the connection arm is rotatably connected to the second end of the crusher jaw.

20. The adjustment assembly of claim 16 wherein upon an overload condition in the crushing gap, the connection arm moves the slider to allow movement of the second end of the crusher jaw.

* * * * *